3,502,647
PERIMIDINE DERIVATIVES
Vasken Paragamian, Dresher, Pa., assignor to McNeil Laboratories, Incorporated, a corporation of Pennsylvania
No Drawing. Continuation-in-part of application Ser. No. 564,554, July 12, 1966. This application Apr. 28, 1967, Ser. No. 636,575
Int. Cl. C07c 47/18, 95/04; C07d 51/28
U.S. Cl. 260—209                                11 Claims

ABSTRACT OF THE DISCLOSURE

The compounds are of the class of perimidines, useful for their central nervous system depressant effects as evidenced by their ability to produce ataxia and protection against metrazol-induced seizure patterns.

This application is a continuation-in-part of my copending application Ser. No. 564,554, filed July 12, 1966, now abandoned.

This invention relates to perimidines having the formula:

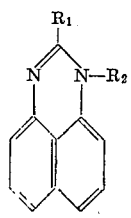

(I)

wherein $R_1$ is a member selected from the group consisting of loweralkoxyloweralkyl, aminoloweralkyl, loweralkylaminoloweralkyl, diloweralkylaminoloweralkyl, mercaptoloweralkyl, loweralkylcarboxylloweralkylmercapto, cyanoloweralkyl, benzyl, pyridyl, furyl, tetrahydrofuryl and pyrrolidinyl; $R_2$ is a member selected from the group consisting of hydrogen, loweralkyl, benzyl, carboxylower-alkyl, loweralkylcarboxyloweralkyl, hydroxyloweralkyl, loweralkylaminocarboxyloweralkyl, diloweralkylaminocarboxyloweralkyl, loweralkylaminocarbonyl; and the nontoxic acid addition salts and the therapeutically active loweralkyl quaternary ammonium derivatives of the basic nitrogen containing members, and perimidines having the formula:

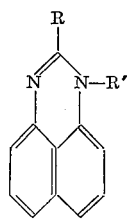

(II)

wherein R is a member selected from the group consisting of hydrogen and loweralkyl; R' is a member selected from the group consisting of aminoloweralkyl, loweralkylaminoloweralkyl, diloweralkylaminoloweralkyl, carboxy-loweralkyl, loweralkylcarboxyloweralkyl, hydroxylower-alkyl, diloweralkylamidoloweralkyl, loweralkylaminocarbonyl; and the nontoxic acid addition salts and the therapeutically active loweralkyl quaternary ammonium derivatives of the basic nitrogen containing members.

The term "loweralkyl" includes alkyl groups containing 1 to 7 carbon atoms, and preferably 1 to 4 carbon atoms, including saturated aliphatic chains, straight or branched, such as methyl, ethyl, propyl, isopropyl, n-butyl and isobutyl.

The therapeutically active nontoxic acid addition salts of the basic nitrogen containing compounds are prepared by treatment with an appropriate acid such as an inorganic acid, e.g., hydrochloric, hydrobromic, hydriodic, sulfuric, nitric or phosphoric; an organic acid such as acetic, propionic, glycolic, lactic, pyruvic, malonic, succinic, maleic, malic, fumaric, tartaric, citric, benzoic, mandelic, cinnamic, methane sulfonic, benzene sulfonic, salicyclic, 2-phenoxybenzoic. Conversely, the salt form may be converted in the usual manner into the free base.

The novel basic nitrogen containing compounds may be converted into the corresponding quaternary ammonium compounds by reaction of the teritary bases with alkylating agents, i.e., alkyl halides such as methyl iodide, ethyl bromide, propyl chloride; lower alkenyl halides-allyl bromide; esters formed by reacting alkanols with an oxygen-containing acid such as dilower alkylsulfates-dimethylsulfate, diethylsulfate; lower alkylarylsulfonates-methyl p-toluenesulfonate or aralkyl halides-benzyl chloride. The quaternizing reaction may be performed in the presence or absence of a solvent, at room temperature or under cooling, at atmospheric pressure or in a closed vessel under pressure. Suitable solvents for this purpose are ethers such as diethylether and tetrahydrofuran, hydrocarbons such as benzene and heptane, ketones such as acetone and butanone, loweralkanols such as ethanol, propanol or butanol; or organic acid amides such as formamide or dimethylformamide. When lower alkyl halogenides are used as the quaternizing agents, diethyl ether and benzene are the preferred solvents.

The compounds of this invention are found to possess useful pharmacological properties. For example, in doses of 30–300 mg./kg. of body weight, ataxia is observed in mice after intraperitoneal administration of these compounds. Ataxia is used as an indication of central nervous system depression. Another indication of the same activity is the effect that many of these compounds show against metrazol-induced seizures. For example, compounds of Formula I, wherein $R_1$ is 3- or 4-pyridyl, acyloxylower-alkyl, or 2-furyl and $R_2$ is hydrogen are active orally in mice in doses of 5–100 mg./kg. of body weight against metrazol-induced seizure patterns. Compounds of Formula II, wherein R is methyl and $R_1$ is carbethoxymethyl or carboxamidomethyl are similarly active in oral doses of 10–100 mg./kg. of body weight. The corresponding acid addition salts have the same utility as the basic compounds.

The novel compounds of Formula I wherein $R_2$ is hydrogen may be prepared by reacting 1,8-diaminonaphthalene with the appropriate carboxylic acid, acid chloride or aldehyde to produce the corresponding 2-substituted perimidines. Aliphatic or aromatic carboxylic acids containing acid-stable groups, such as amino, hydroxy or mercapto groups, may be reacted with 1,8-diaminonaphthalene in 4 N aqueous hydrochloric acid at the reflux temperature for 24–72 hours. Aliphatic or aromatic carboxylic acid chlorides may be reacted with 1,8-diaminonaphthalene in inert solvents such as ether, benzene (or other aromatic solvents) at room or elevated temperatures. Aliphatic or aromatic aldehydes, with or without additional functional groups, such as nitrile or amines, may be reacted with 1,8-diaminonaphthalene in an aromatic solvent, such as benzene, toluene or xylene, or in an alcoholic solvent, such as methanol or ethanol, at room or elevated temperatures in the presence of a catalyst, such as palladium-on-carbon or platinum. Some of the mercapto derivatives may be prepared by reacting 2-thioperimidone with alkylating agents, such as loweralkyl halides, halocarboxylic acids or halotertiary amines, in an inert solvent, such as tetrahydrofuran, dioxane, 1,2-dimethoxyethane or diglyme, at room or elevated temperatures.

The novel compounds of Formula I wherein $R_2$ is not hydrogen and the novel compounds of Formula II wherein R is hydrogen or loweralkyl may be prepared by reacting the appropriate 2-substituted perimidine (or in the case of Formula II wherein R is hydrogen, perimidine) with the appropriate N-alkylating agent, such as a diloweralkylaminoloweralkyl halide, an α, β or γ halo carboxylic acid derivative, such as esters or amides, in the presence of a strong base, such as sodium hydride or sodium amide, in an inert solvent, such as 1,2-dimethoxyethane, diglyme, benzene, toluene or xylene at room or elevated temperatures. The resulting carboxylic acid derivatives may be converted to 1-hydroxyloweralkyl or 1-aminoloweralkyl perimidines by reduction (for example by using a hydride reducing agent such as lithium aluminum hydride in an inert solvent such as ether or tetrahydrofuran). The corresponding carboxylic acids may be prepared by hydrolysis of the carboxylic acid derivatives with an acid or a base. When the perimidines have functional groups sensitive to the alkylating conditions employed, such groups are protected. The protective group is removed after the alkylation is effected. For example, a hydroxyl group may be converted to an acetate ester by means of acetic anhydride. The nitrogen in the 1-position is alkylated and subsequently the acetate ester is hydrolyzed with an aqueous solution of a base.

Illustrative of the novel compounds of this invention which may be prepared by the methods set forth hereinabove are the following:

2-(4-pyridyl)-N-methyl-1-perimidinecarboxamide
1-(3-dimethylaminopropyl)-2-(1-methyl-2-pyrrolidyl)-perimidine
2-(3-pyridyl)-perimidine-1-propionic acid
2-methoxymethyl-perimidineacetic acid
1-dimethylaminopropyl-2-(4-pyridyl)-perimidine
N,2-di-(3-aminopropyl)-perimidine
1-(3-aminopropyl)-perimidine-2-carboxamide
2-(1,2-dihydroxyethyl)-N-methyl-perimidine-1-carboxamide
1-dimethylaminopropyl-2-benzyl-perimidine
2-gluco-N-methyl-perimidine-1-carboxamide
1-benzyl-2-(4-pyridyl)-perimidine.

The following examples are intended to illustrate, but not to limit, the scope of the present invention.

EXAMPLE I

To a 4.8 g. suspension of sodium hydride (50% in mineral oil) in 250 ml. of monoglyme is added 2-benzylperimidine (25.8 g., 0.1 mole) as a solid, over a period of one hour. The resulting solution is stirred at room temperature for one hour. Ethyl bromoacetate (20 g., 0.12 mole) is added to the reaction mixture. The reaction mixture is heated slowly to 60° C., allowed to come to room temperature and stirred for two hours. Most of the monoglyme is removed under reduced pressure and the residue is poured onto ice and extracted with chloroform. After drying and removal of the chloroform, the residual oil is passed through a column of alumina. Fractions eluted with petroleum ether are combined and crystallized in ethanol. The product is ethyl 2-benzyl-3-pyrimidylacetate, M.P. 130–131° C.

EXAMPLE II

To a stirring solution of 4 g. of 54% sodium hydride in 200 cc. freshly distilled monoglyme, 15 g. (.09 mole) of perimidine is added, and allowed to stir for one and one-half hours. Approximately 7 g. (.18 mole) of N,N-dimethylaminopropyl chloride (prepared from 57 g. of N,N-dimethylaminopropyl chloride hydrochloride) is added to the reaction mixture and allowed to stir at room temperature for 19½ hours. Removal of the solvent leaves a residue which is dissolved in 10% aqueous hydrochloric acid. This acid solution is extracted several times with ether and chloroform and then the acid solution is made basic with 10% sodium hydroxide solution. The basic solution is extracted with ether. The ether extract is dried with magnesium sulfate and distilled under reduced pressure to remove the solvent leaving an oily amine. The hydrochloride salt is prepared and recrystallized from ethanol. The product is dimethylaminopropylperimidine dihydrochloride, M.P. 285–287° C.

EXAMPLE III 2-methylperimidine (47 g., 0.26 mole) is suspended in 400 ml. of acrylonitrile and a sodium ethoxide solution (from 0.8 g. of sodium and 15 ml. of ethanol) is added to the suspension dropwise and with stirring. After the exothermic reaction subsides, the resulting homogeneous solution is refluxed for 1½ hours. It is then concentrated to one-half of its original volume and triturated with benzene. A solid precipitates and is filtered off. The filtrate is concentrated. The residual oil is triturated with ethyl acetate with cooling. The resulting solid is recrystallized twice from ethyl acetate-cyclohexane. The product is 2 - (2 - methyl - 3 - perimidyl)propionitrile, M.P. 145–146° C.

EXAMPLE IV

A 200 ml. ethanol solution of 2-methyl-1-perimidinepropionitrile (9 g., 0.04 mole) is saturated with dry hydrogen chloride and the resulting mixture is refluxed for 4 hours, then allowed to stand at room temperature for 16 hours. The solution is concentrated, diluted with water, made basic with potassium carbonate and extracted with chloroform. After drying, the solvent is removed and the residual oil converted to its hydrochloride salt by reaction of an ethanol solution of the oil with ethereal hydrogen chloride. The resulting solid is recrystallized twice from ethanol-ether. The product is ethyl 2-methylperimidine-1-propionate hydrochloride, M.P. 188.5–189.5° C.

EXAMPLE V

A 10 g. (0.042 mole) sample of 2-(2-methyl-3-perimidyl)propionitrile is dissolved in 100 ml. of 18% aqueous hydrochloric acid and the resulting solution is refluxed for 3 hours. After cooling, the separated solid is filtered, dried and recrystallized twice from ethanol-ether. The product is 2-methylperimidine - 1 - propionic acid hydrochloride hemihydrate, M.P. dec. 290° C.

EXAMPLE VI

A 9.60 g. (.0378 mole) sample of ethyl perimidine-1-acetate in 35 cc. of tetrahydrofuran is added cautiously to a suspension of 4.3 g. (.1134 mole) of lithium aluminum hydride in 250 cc. of dry ether. The reaction mixture is stirred at room temperature for 24 hours. After the destruction of excess lithium aluminum hydride by addition of ethyl acetate and water, the reaction is filtered and the inorganics are washed thoroughly with benzene. The filtrate and the wash are combined and distilled under reduced pressure to remove the solvent giving an oil which crystallizes upon the addition of water. The solid is recrystallized from benzene. The product is 2-(2,3-dihydroperimidine)ethanol, M.P. 81–83° C.

EXAMPLE VII

A 10.35 g. (.0484 mole) quantity of 2-(2,3-dihydroperimidine)ethanol in 300 cc. benzene is stirred for 55 hours at room temperature with 4.14 g. 10% palladium-on-carbon. The reaction is then heated and filtered hot. The residue is washed thoroughly with hot ethyl acetate and the wash is combined with the filtrate and evaporated to a solid which is recrystallized from benzene-ethyl acetate. The product is 2-(1-perimidine)ethanol, M.P. 206–207° C.

EXAMPLE VIII

A 28 g. sample (0.1 mole of ethyl 2-methylperimidine-1-acetate is hydrolyzed by refluxing with 4.1 g. of sodium hydroxide in 250 ml. of aqueous ethanol for 3½ hours. After concentration of the solution and dilution with water, the solution is acidified to pH 5 and the separated solid is filtered and dried. It is subsequently washed with hot water and dried at 140° C./0.2 mm. for 4 days. The product is 2-methyl-1-perimidineacetic acid, M.P. 250–251° C.

EXAMPLE IX

To a suspension of 10.8 g. (.22 mole) of sodium hydride (50% in mineral oil) in 500 ml. of monoglyme is added 41 g. (.22 mole) of 2-methylperimidine and the resulting mixture is stirred at room temperature for 2½ hours. N,N-dimethylchloroacetamide 27.4 g., .22 mole) is added dropwise and the reaction mixture is stirred at room temperature for 20 hours, then heated at reflux for 2½ hours and allowed to cool. The reaction mixture is filtered and the filtrate is evaporated to ⅓ its volume and diluted with water. The solution is extracted several times with chloroform. The chloroform is evaporated to a solid which is crystallized from ethanol and water. The product is 2,N,N-trimethyl-1-perimidineacetamide, M.P. 212–214° C.

EXAMPLE X

A mixture of 5 g. (0.025 mole) of 2-perimidinemethanol, 3 ml. of methyl isocyanate and 2 ml. of pyridine are mixed in 75 ml. of benzene and the resulting mixture is refluxed for 18 hours. After cooling, the separated solid is filtered and recrystallized from ethyl acetateethanol. The product is 2-hydroxymethyl-N-methyl-1-perimidinecarboxamide, M.P. 192–193° C.

EXAMPLE XI

To a 9.4 g. suspension of sodium hydride (50% in mineral oil) in monoglyme is added a solution of 50 g. (0.196 mole) of 1-(2-perimidyl)ethyl acetate in monoglyme and the resulting mixture is stirred at room temperature for 3 hours. Methyl iodide (28 g.) is then added and stirring is continued for an additional 2 hours. The mixture is then filtered, the filtrate is concentrated to ⅓ its volume and diluted with water, extracted with chloroform and dried. Removal of the solvent leaves an oil which crystallizes in methylcyclohexane and is recrystallized from this solvent. The product is 1-[2-(1-methyl)-perimidyl]ethyl acetate, M.P. 119–121° C.

EXAMPLE XII

A 14.6 g. sample of 1-[2-(1-methyl)-perimidyl]-ethyl acetate is hydrolyzed by refluxing in aqueous alcohol in the presence of 2.2 g. of sodium hydroxide for 3 hours. The reaction solution is concentrated, the product taken up in chloroform and dried. Removal of the solvent leaves a solid which is recrystallized from methylcyclohexane. The product is 1,α-dimethyl-2-perimidinemethanol, M.P. 112–113° C.

EXAMPLE XIII

To a 2.9 g. suspension of sodium hydride (50% in mineral oil) in 250 ml. of monoglyme is added 13 g. of 2-methoxymethylperimidine and the resulting mixture is stirred for 5 hours. Methyl iodide (8.7 g.) is then added and the mixture is stirred at room temperature for 16 hours, then refluxed for 2 hours and concentrated. Upon dilution with water, a solid separates. The solid is recrystallized from methylcyclohexane-chloroform. The product is 1-methyl-2-(methoxymethyl)perimidine, M.P. 86–87° C.

EXAMPLE XIV

To a 125 ml. ethanol solution of 1,8-diaminonaphthalene (15.8 g., 0.1 mole) is added 10.7 g. (0.1 mole) of 4-pyridinecarboxaldehyde over a period of 10 minutes. The resulting solution becomes warm and is then heated to 60° C. for 30 minutes, cooled in an ice-bath and the separated solid is filtered. The solid is recrystallized from acetone-ethanol. The product is 2,3-dihydro-2-(4-pyridyl)perimidine, M.P. 239–240° C.

EXAMPLE XV

A 50 ml. xylene solution of 2,3-dihydro-2-(4-pyridyl)perimidine (1.6 g., 0.0065 mole) is refluxed for 45 minutes in the presence of 0.8 g. of 10% palladium-on-carbon catalyst. The resulting mixture is filtered while hot and the filtrate is cooled overnight. The separated crystals are filtered and recrystallized from ethanol. The product is 2-(4-pyridyl)perimidine, M.P. 224–225° C.

EXAMPLE XVI 1,8-diaminonaphthalene (96 g., .6 mole) and 3-pyridinecarboxaldehyde (65 g., .6 mole) are dissolved in 500 ml. of absolute ethanol. The reaction mixture is refluxed for 2 hours and cooled to room temperature. The separated solid is filtered and recrystallized from methanol. The product is 2,3-dihydro - 2 - (3-pyridyl)perimidine, M.P. 165–166° C.

EXAMPLE XVII 2,3-dihydro - 2 - (3-pyridyl)perimidine (20.8 g., .085 mole) is added to 400 ml. of xylene and 3 g. of 10% palladium-on-carbon. The reaction mixture is stirred and refluxed for 4 hours. The reaction mixture is then filtered rapidly while still hot. A solid separates from the filtrate upon cooling. The product is 2-(3-pyridyl)perimidine. M.P. 223–225° C.

EXAMPLE XVIII 1,8-diaminonaphthalene (31.6 g., 0.2 mole) and furfural (20 g., 0.2 mole) are mixed in 250 ml. of ethanol in the presence of 3 g. of 10% palladium-on-carbon catalyst and the resulting mixture is refluxed for 7 hours and then filtered. The filtrate is diluted with water and the separated solid is filtered and recrystallized from ethyl acetate-cyclohexane. The product is 2-(2-furyl)-perimidine, M.P. 178–179° C.

EXAMPLE XIX

A 10 g. sample of 2-(2-furyl)-perimidine is hydrogenated in a mixture of 120 ml. of ethanol and 35 ml. of 10% hydrochloric acid in the presence of 0.5 g. of platinum oxide at an initial pressure of 35 p.s.i. After 6 hours the hydrogen uptake stops. The catalyst is filtered off and the filtrate is concentrated, diluted with water, made basic with ammonia and extracted with chloroform. Drying and removal of the solvent leaves an oil which is crystallized in ethyl acetate-cyclohexane and recrystallized from the same solvents. The product is 2-(tetrahydrofuryl) perimidine, M.P. 155–156° C.

EXAMPLE XX 1,8-diaminonaphthalene (31.6 g., 0.2 mole) is combined with N-methyl-2-pyrrole carboxaldehyde (21.8 g., 0.2 mole) and 7 g. of 10% palladium-on-carbon in 250 ml. of absolute ethanol. The mixture is stirred under reflux for 4 hours. The catalyst is removed by filtration and the filtrate is treated immediately with ethereal hydrogen chloride. A solid precipitates and is recrystallized from ethanol. The product is 2-(1-methyl-2-pyrrolyl)perimidine hydrochloride; chars 270° C.

EXAMPLE XXI

Pyrrole-2-carboxaldehyde (19.8 g., 0.2 mole), 1,8-diaminonaphthalene (31.6 g., 0.2 mole) and palladium-on-carbon (10%, 7 g.) are combined in 250 ml. of ethanol. The reaction mixture is stirred and heated under reflux for one hour. The catalyst is removed by filtration while the mixture is still hot. The cooled filtrate is treated with ethereal hydrogen chloride to give a solid which is recrystallized from methanol. The product is 2-(2-pyrrolyl)perimidine hydrochloride; chars 270° C.

EXAMPLE XXII

A solution of 15.8 g. (0.1 mole) of 1,8-diaminonaphthalene and 12.9 g. (0.1 mole) of 2,2-dimethyl-3-dimethylaminopropionaldehyde in 120 ml. of ethanol, containing 3.1 g. of 10% palladium-on-carbon catalyst is refluxed for 3 hours and filtered hot. Upon dilution of the filtrate with 80 ml. of water and cooling a solid separates. The product is 2-(1,1-dimethyl-2-dimethylaminoethyl)perimidine, M.P. 131–132° C.

EXAMPLE XXIII 1,81diaminonaphthalene (31.6 g., 0.2 mole) and $\alpha,\alpha$-dimethyl-$\gamma$-cyanobutyronitrile (25 g., 0.2 mole) are mixed in 200 ml. of ethanol in the presence of 3 g. of 10% palladium-on-carbon catalyst. The resulting mixture is refluxed for 2½ hours and is then filtered. The filtrate is diluted to 300 ml. with water and cooled overnight. The separated solid is filtered and recrystallized from aqueous methanol. The product is $\gamma,\gamma$-dimethyl - 2 - perimidine-butyronitrile, M.P. 178–179° C.

EXAMPLE XXIV

A 10 g. (.05 mole) quantity of 2-thioperimidone is dissolved in 220 cc. tetrahydrofuran together with 55 cc. dimethylformamide. To this solution is added 8.95 g. (.053 mole) ethyl bromoacetate. The mixture is stirred at room temperature for 20 hours. Filtration of the reaction mixture yields a solid which is recrystallized twice from ethanol-benzene. The product is 2-[(ethoxy-carbonylmethyl)thio]perimidine hydrobromide, M.P. above 260° C.

EXAMPLE XXV 1,8-diaminonaphthalene (31.6 g., 0.2 mole) and ethyl cyanoacetate (freshly distilled, 86 g., 0.76 mole) are combined and heated under reflux for 18 hours. The reaction mixture is cooled, diluted with ether, then treated with ethereal hydrogen chloride. A solid material is obtained. Recrystallization from aqueous alcohol in the presence of activated carbon yields a solid material. The product is 2-perimidineacetonitrile hydrochloride, chars at 268° C.

EXAMPLE XXVI

Ethyl oxamate (89.0 g., 0.76 mole) is mixed with 1,8-naphthalenediamine (31.6 g., 0.2 mole). The mixture is melted and heated, with stirring, for 2 hours. The mixture is cooled, and the resulting solid is triturated with boiling benzene and then with boiling ethyl acetate. The solutions are concentrated partially. The solid obtained as a residue is insoluble in boiling ethyl acetate. This solid is recrystallized from ethanol. The product is 2-perimidinecarboxamide, M.P. 243–244.5° C.

EXAMPLE XXVII 1,8-diaminonaphthalene (50 g., 0.32 mole) is suspended in 600 ml. 4 N hydrochloric acid. Mercaptoacetic acid (45 g., 0.48 mole) is added. The reaction mixture is stirred and heated under reflux for 18 hours. The reaction mixture is then cooled, and the suspended solid material is recovered by filtration. The solid material is recrystallized from water and then from methanol. The product is 2 - perimidinemethanethiol hydrochloride, M.P. 220–222° C.

EXAMPLE XXVIII 1,8-diaminonaphthalene (31.6 g., 0.2 mole) is suspended in 400 ml. of 4 N hydrochloric acid. Glyceric acid (49 g., 0.3 mole 65% in water) is added. The mixture is stirred and heated under reflux for 18 hours. Upon cooling, some crystallization occurs. The solid is removed by filtration. It consists admixed with several dark-red large chunks of oily solid. The lumps are removed and the orange crystals of the hydrochloride salt are recrystallized from ethanol in the presence of activated carbon. The hydrochloride salt is converted to the free base by treatment with dilute ammonia and recovery of the resulting solid by filtration. The solid is recrystallized twice from ethyl acetate. The product is (2-perimidyl) 1,2-ethanediol, M.P. 193–193.5° C.

EXAMPLE XXIX 1,8-diaminonaphthalene (3.16 g., 0.02 mole) and $\delta$-gluconolactone (3.6 g., 0.02 mole) are mixed in a solution of 10 ml. of water, 3 ml. of ethanol, 2 ml. of concentrated hydrochloric acid and 2 ml. of 85% phosphoric acid. The resulting mixture is heated on a steam bath for 10 minutes to achieve solution, then heated in an oil bath set at 145° C. After almost all the water and ethanol has evaporated, the mixture is cooled, dissolved in 100 ml. of water and rendered basic with ammonia (pH 10). The resulting solid is filtered and recrystallized from dimethylformamide. The product is 2-glucoperimidine, M.P. 213–214° C.

EXAMPLE XXX

Equivalent amounts of 1,8-diaminonaphthalene and $\gamma$-aminobutyric acid are refluxed for three days in 4 N aqueous hydrochloric acid. The product is filtered off and recrystallized from ethanol. The product is 2-(3-aminopropyl)-perimidine.

EXAMPLE XXXI

Using the procedure of Example III and replacing 2-methylperimidine with an equivalent amount of 2-(4-pyridyl)-perimidine, the product obtained is 2-(4-pyridyl)-3-perimidylpropionitrile. Starting with this product in equivalent amount and replacing 2-(2-methyl-3-perimidyl) propionitrile in the procedure of Example V, the product obtained is 2-(4-pyridyl)-perimidine-1-propionic acid.

EXAMPLE XXXII

Using the procedure of Example I and replacing 2-methylperimidine with an equivalent amount of 2-(4-pyridyl)-perimidine, the product obtained is N,N-dimethyl-2-(4-pyridyl)-1-perimidineacetamide.

EXAMPLE XXXIII

Using the procedure of Example III and replacing 2-methylperimidine with an equivalent amount of 2-(2-tetrahydrofuryl)-perimidine, the product obtained is 2-(2-tetrahydrofuryl-3-perimidyl)propionitrile. Starting with this product is equivalent amount replacing 2-methyl-1-perimidene-propionitrile in the procedure of Example IV, the product obtained is ethyl 2-(2-tetrahydrofuryl)-perimidine-1-propionate.

EXAMPLE XXXIV

Using the procedure of Example II and replacing perimidine with an equivalent amount of 2-(2-furyl)-perimidine, the product obtained is 1-dmethylamnopropyl-2-(2-furyl)-permidine.

EXAMPLE XXXV 1-(2-cyanoethyl)-perimidine is reacted with 3 equivalents of lithium aluminum hydride in tetrahydrofuran by refluxing for 3 hours. After the decomposition of excess hydride with water, the inorganic salts are filtered off and the filtrate is concentrated to yield a solid. The product obtained is 1-(3-aminopropyl)-perimidine.

EXAMPLE XXXVI 2-methylperimidine is reacted with methyl isocyanate in the presence of pyridine in benzene solution by refluxing for 18 hours. The product separates when the solution is cooled. The product obtained is 2,N-dimethyl-1-perimidinecarboxamide.

EXAMPLE XXXVII

Ethyl acetoacetate (272 g., 2.08 mole) and 1,8-diaminonaphthalene (86 g., 0.54 mole) are combined, heated slowly to reflux and then refluxed gently for ½ hour. The reaction mixture is allowed to cool slowly. The crystals formed are removed by filtration and washed with ether. Recrystallization of some of this product from ethanol yields 2(3H)-perimidylidene-2-propanone; M.P. 258–260° C.

EXAMPLE XXXVIII

2(3H)-perimidylidene-2-propanone (40 g., 0.18 mole) is suspended in 400 ml. glacial acetic acid. Platinum oride catalyst (4 g.) is added. The mixture is hydrogenated at 50 pounds pressure. After 4 hours hydrogen takeup ceases. The catalyst is removed by filtration. The solution is cooled, basified with concentrated ammonium hydroxide and extracted thoroughly with chloroform. Water is removed from the solution with magnesium sulfate and the solution is concentrated. The resulting solid is washed with ether and dried. Recrystallization from ethyl acetate (twice) yields α-methyl-2-perimidineethanol, M.P. 151–151.5° C.

EXAMPLE XXXIX

To a sodium hydride suspension 2.4 g., of 50% on mineral oil) in monoglyme (250 ml.) is added 2-perimidinemethanol (10 g., 0.05 mole). The mixture is stirred at room temperature for three hours. After the addition of 7.1 g. of methyl iodide, the mixture is further stirred for two hours, then concentrated and diluted with water. The separated solid is filtered and recrystallized from ethyl acetate to yield 2-methoxymethylperimidine, M.P. 165–167° C.

EXAMPLE XL

To a 4.8 g. suspension of sodium hydride (50% on mineral oil) in 200 ml. of monoglyme is added 17 g. of 2-methylperimidine. The resulting mixture is stirred for one hour at room temperature. Ethyl bromoacetate (17 g.) is added and the mixture is stirred for 4 hours, then concentrated and diluted with water. The separated solid is filtered and recrystallized twice from aqueous ethanol to yield ethyl 2-methylperimidine-1-acetate, M.P. 132–133° C.

EXAMPLE XLI

Using the procedure of Example XL and replacing 2-methylperimidine with an equivalent amount of perimidine, the product obtained is ethyl perimidine-1-acetate, M.P. 109–110° C.

I claim:
1. A member selected from the group of perimidines having the formula

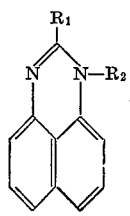

wherein $R_1$ is a member selected from the group consisting of loweralkoxyloweralkyl, aminoloweralkyl, loweralkylaminoloweralkyl, diloweralkylaminoloweralkyl, mercaptoloweralkyl, loweralkylcarboxyloweralkylmercapto, cyanoloweralkyl, benzyl, pyridyl, furyl, tetrahydrofuryl and pyrrolidinyl; $R_2$ is a member selected from the group consisting of hydrogen, loweralkyl, benzyl, carboxyloweralkyl, loweralkylcarboxyloweralkyl, hydroxyloweralkyl, loweralkylaminocarboxyloweralkyl, diloweralkylaminocarboxyloweralkyl, loweralkylaminocarbonyl; and the nontoxic acid addition salts of the basic nitrogen containing members.

2. A member selected from the group of perimidines having the formula

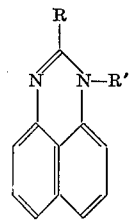

wherein R is a member selected from the group consisting of hydrogen and loweralkyl; R' is a member selected from the group consisting of aminoloweralkyl, loweralkylaminoloweralkyl, diloweralkylaminoloweralkyl, carboxyloweralkyl, loweralkylcarboxyloweralkyl, hydroxyloweralkyl, diloweralkylamidoloweralkyl, loweralkylaminocarbonyl; and the non-toxic acid addition salts of the basic nitrogen containing members.

3. 2-gluco-perimidine.
4. (2-perimidyl)-1,2-ethanediol.
5. α-methyl-2-perimidineethanol.
6. 2-(2-furyl)-perimidine.
7. 2-(2-tetrahydrofuryl)-perimidine.
8. 2,N,N-trimethyl-1-perimidineacetamide.
9. 2-hydroxymethyl - N-methyl-1-perimidinecarboxamide.
10. 2-methoxymethyl perimidine.
11. 2-(3-pyridyl)-perimidine.

References Cited

UNITED STATES PATENTS
2,680,114  6/1954  Sartori _____ 260—256.4

LEWIS GOTTS, Primary Examiner
J. R. BROWN, Assistant Examiner

U.S. Cl. X.R.
260—251, 256.4; 424—251

PO-1050
(5/69)

UNITED STATES PATENT OFFICE
CERTIFICATE OF CORRECTION

Patent No. 3,502,647          Dated March 24, 1970

Inventor(s) Vasken Paragamian

It is certified that error appears in the above-identified patent and that said Letters Patent are hereby corrected as shown below:

Column 2, line 13, the word "teritary" should read -- tertiary --. Column 4, line 73, an end of parenthesis should be inserted after the word "mole". Column 5, line 12, a beginning of parenthesis should be inserted before the numeral "27.4". Column 7, line 8, "1,81diaminonapthalene" should read -- 1,8-diaminonapthalene --. Column 8, line 42, the word "is" should read -- in --. Column 8, line 32, "Example I" should read -- Example IX --. Column 8, line 49, the word "dimethylaminopropyl" is mispelled. Column 8 line 51, the word "permidine" should read -- perimidine --. Column 9, line 5, the word "oride" should read -- oxide --. Column 9, line 18, a beginning of parenthesis should be inserted before the numeral "2.4".

SIGNED AND
SEALED
AUG 25 1970

(SEAL)
Attest:

Edward M. Fletcher, Jr.
Attesting Officer

WILLIAM E. SCHUYLER, JR.
Commissioner of Patents